(12) United States Patent
Deshpande

(10) Patent No.: US 10,397,606 B2
(45) Date of Patent: Aug. 27, 2019

(54) SYSTEM FOR SIGNALING IFR AND BLA PICTURES

(71) Applicant: Sharp Laboratories of America, Inc., Camas, WA (US)

(72) Inventor: Sachin G. Deshpande, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 15/875,540

(22) Filed: Jan. 19, 2018

(65) Prior Publication Data

US 2018/0338158 A1 Nov. 22, 2018

Related U.S. Application Data

(63) Continuation of application No. 14/033,073, filed on Sep. 20, 2013, now abandoned.

(60) Provisional application No. 61/708,033, filed on Sep. 30, 2012.

(51) Int. Cl.
| | | |
|---|---|---|
| *H04N 19/58* | (2014.01) | |
| *H04N 19/70* | (2014.01) | |
| *H04N 19/46* | (2014.01) | |

(52) U.S. Cl.
CPC ............ *H04N 19/58* (2014.11); *H04N 19/46* (2014.11); *H04N 19/70* (2014.11)

(58) Field of Classification Search
None
See application file for complete search history.

(56) References Cited

U.S. PATENT DOCUMENTS

| | | | | |
|---|---|---|---|---|
| 8,165,216 B2* | 4/2012 | Chen | ............ | H04N 19/597 375/240.24 |
| 2008/0137742 A1* | 6/2008 | Chen | ............ | H04N 19/597 375/240.13 |
| 2009/0279608 A1* | 11/2009 | Jeon | ............ | H04N 19/597 375/240.16 |
| 2010/0020871 A1* | 1/2010 | Hannuksela | ......... | H04N 21/438 375/240.12 |
| 2010/0189182 A1* | 7/2010 | Hannuksela | ... | H04N 21/234327 375/240.25 |
| 2010/0290537 A1* | 11/2010 | Moriyoshi | ........... | G11B 27/007 375/240.25 |
| 2011/0013889 A1* | 1/2011 | Wu | ................ | H04N 5/783 386/356 |
| 2011/0274166 A1* | 11/2011 | Jeon | ................ | G06T 9/00 375/240.12 |
| 2012/0099643 A1* | 4/2012 | Karegoudar | ........... | H04N 19/46 375/240.06 |
| 2012/0147137 A1* | 6/2012 | Jeon | .............. | H04N 21/2365 348/43 |

(Continued)

OTHER PUBLICATIONS

Bross et al., "High Efficiency Video Coding (HEVC) Text Specification Draft 6," Document: JCTVC-H1103, Feb. 1-10, 2012. (Year: 2012).*

*Primary Examiner* — Reza Aghevli
(74) *Attorney, Agent, or Firm* — Chernoff, Vilhauer, McClung & Stenzel, LLP

(57) ABSTRACT

A system for decoding a video bitstream includes receiving a frame of the video that includes at least one slice and at least one tile and where each of the at least one slice and the at least one tile are not all aligned with one another.

8 Claims, 13 Drawing Sheets

(56) References Cited

U.S. PATENT DOCUMENTS

| | | | | |
|---|---|---|---|---|
| 2012/0163469 A1* | 6/2012 | Kim | ............... | H04N 19/176 375/240.18 |
| 2013/0235152 A1* | 9/2013 | Hannuksela | ......... | H04N 19/597 348/43 |

* cited by examiner

| slice_header( ) { | Descriptor |
|---|---|
|   first_slice_in_pic_flag | u(1) |
|   if( RapPicFlag ) | |
|     no_output_of_prior_pics_flag | u(1) |
|   pic_parameter_set_id | ue(v) |
|   if( !first_slice_in_pic_flag ) | |
|     slice_address | u(v) |
|   if( dependent_slice_enabled_flag && !first_slice_in_pic_flag ) | |
|     dependent_slice_flag | u(1) |
|   if( !dependent_slice_flag ) { | |
|     slice_type | ue(v) |
|     if( output_flag_present_flag ) | |
|       pic_output_flag | u(1) |
|     if( separate_colour_plane_flag = = 1 ) | |
|       colour_plane_id | u(2) |
|     pic_order_cnt_lsb | u(v) |
|     if( !IdrPicFlag ) { | |
|       short_term_ref_pic_set_sps_flag | u(1) |
|       if( !short_term_ref_pic_set_sps_flag ) | |
|         short_term_ref_pic_set( num_short_term_ref_pic_sets ) | |
|       else | |
|         short_term_ref_pic_set_idx | u(v) |
|   ... | |

SLICE HEADER

FIG. 10

| slice_header( ) { | Descriptor |
|---|---|
|   first_slice_in_pic_flag | u(1) |
|   if( RapPicFlag ) | |
|     no_output_of_prior_pics_flag | u(1) |
|   pic_parameter_set_id | ue(v) |
|   if( !first_slice_in_pic_flag ) | |
|     slice_address | u(v) |
|   if( dependent_slice_enabled_flag && !first_slice_in_pic_flag ) | |
|     dependent_slice_flag | u(1) |
|   if( !dependent_slice_flag ) { | |
|     slice_type | ue(v) |
|     if( output_flag_present_flag ) | |
|       pic_output_flag | u(1) |
|     if( separate_colour_plane_flag == 1 ) | |
|       colour_plane_id | u(2) |
|     if( !IdrBlaPicFlag ) { | |
|       pic_order_cnt_lsb | u(v) |
|       short_term_ref_pic_set_sps_flag | u(1) |
|       if( !short_term_ref_pic_set_sps_flag ) | |
|         short_term_ref_pic_set( num_short_term_ref_pic_sets ) | |
|       else | |
|         short_term_ref_pic_set_idx | u(v) |
|   ... | |

SLICE HEADER

FIG. 11

| slice_header( ) { | Descriptor |
|---|---|
|   first_slice_in_pic_flag | u(1) |
|   if( RapPicFlag ) | |
|     no_output_of_prior_pics_flag | u(1) |
|   pic_parameter_set_id | ue(v) |
|   if( !first_slice_in_pic_flag ) | |
|     slice_address | u(v) |
|   if( dependent_slice_enabled_flag && !first_slice_in_pic_flag ) | |
|     dependent_slice_flag | u(1) |
|   if( !dependent_slice_flag ) { | |
|     slice_type | ue(v) |
|     if( output_flag_present_flag ) | |
|       pic_output_flag | u(1) |
|     if( separate_colour_plane_flag == 1 ) | |
|       colour_plane_id | u(2) |
|     if( !IdrBlaPicFlag ) | |
|       pic_order_cnt_lsb | u(v) |
|     if( !IdrPicFlag ) { | |
|       short_term_ref_pic_set_sps_flag | u(1) |
|       if( !short_term_ref_pic_set_sps_flag ) | |
|         short_term_ref_pic_set( num_short_term_ref_pic_sets ) | |
|       else | |
|         short_term_ref_pic_set_idx | u(v) |
|   ... | |

SLICE HEADER

FIG. 12

| | Descriptor |
|---|---|
| slice_header( ) { | |
|   pic_order_cnt_lsb | u(v) |
|   first_slice_in_pic_flag | u(1) |
|   if( RapPicFlag ) | |
|     no_output_of_prior_pics_flag | u(1) |
|   pic_parameter_set_id | ue(v) |
|   if( !first_slice_in_pic_flag ) | |
|     slice_address | u(v) |
|   if( dependent_slice_enabled_flag && !first_slice_in_pic_flag ) | |
|     dependent_slice_flag | u(1) |
|   if( !dependent_slice_flag ) { | |
|     slice_type | ue(v) |
|     if( output_flag_present_flag ) | |
|       pic_output_flag | u(1) |
|     if( separate_colour_plane_flag == 1 ) | |
|       colour_plane_id | u(2) |
|     if( !IdrPicFlag ) { | |
|       short_term_ref_pic_set_sps_flag | u(1) |
|       if( !short_term_ref_pic_set_sps_flag ) | |
|         short_term_ref_pic_set( num_short_term_ref_pic_sets ) | |
|       else | |
|         short_term_ref_pic_set_idx | u(v) |
|   ... | |

SLICE HEADER

FIG. 13

SYSTEM FOR SIGNALING IFR AND BLA PICTURES

CROSS-REFERENCE TO RELATED APPLICATIONS

This application is a continuation of U.S. patent application Ser. No. 14/033,073, filed Sep. 20, 2013, which application claims the benefit of U.S. Provisional App. No. 61/708,033, filed Sep. 30, 2012.

BACKGROUND OF THE INVENTION

The present invention relates to video encoding and decoding.

Electronic devices have become smaller and more powerful in order to meet consumer needs and to improve portability and convenience. Consumers have become dependent upon electronic devices and have come to expect increased functionality. Some examples of electronic devices include desktop computers, laptop computers, cellular phones, smart phones, media players, integrated circuits, etc.

Some electronic devices are used for processing and/or displaying digital media. For example, portable electronic devices now allow for digital media to be produced and/or consumed at almost any location where a consumer may be. Furthermore, some electronic devices may provide download or streaming of digital media content for the use and enjoyment of a consumer.

Digital video is typically represented as a series of images or frames, each of which contains an array of pixels. Each pixel includes information, such as intensity and/or color information. In many cases, each pixel is represented as a set of three colors. Some video coding techniques provide higher coding efficiency at the expense of increasing complexity. Increasing image quality requirements and increasing image resolution requirements for video coding techniques also increase the coding complexity.

The increasing popularity of digital media has presented several problems. For example, efficiently representing high-quality digital media for storage, transmittal, and playback presents several challenges. Techniques that represent digital media more efficiently is beneficial.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 7 illustrates a frame with a slice and 9 tiles.

FIG. 8 illustrates a frame with three slices and 3 tiles.

FIG. 10 illustrates an exemplary slice header.

FIG. 11 illustrates an exemplary slice header.

FIG. 12 illustrates an exemplary slice header.

FIG. 13 illustrates an exemplary slice header.

DETAILED DESCRIPTION OF PREFERRED EMBODIMENT

Figure 1:
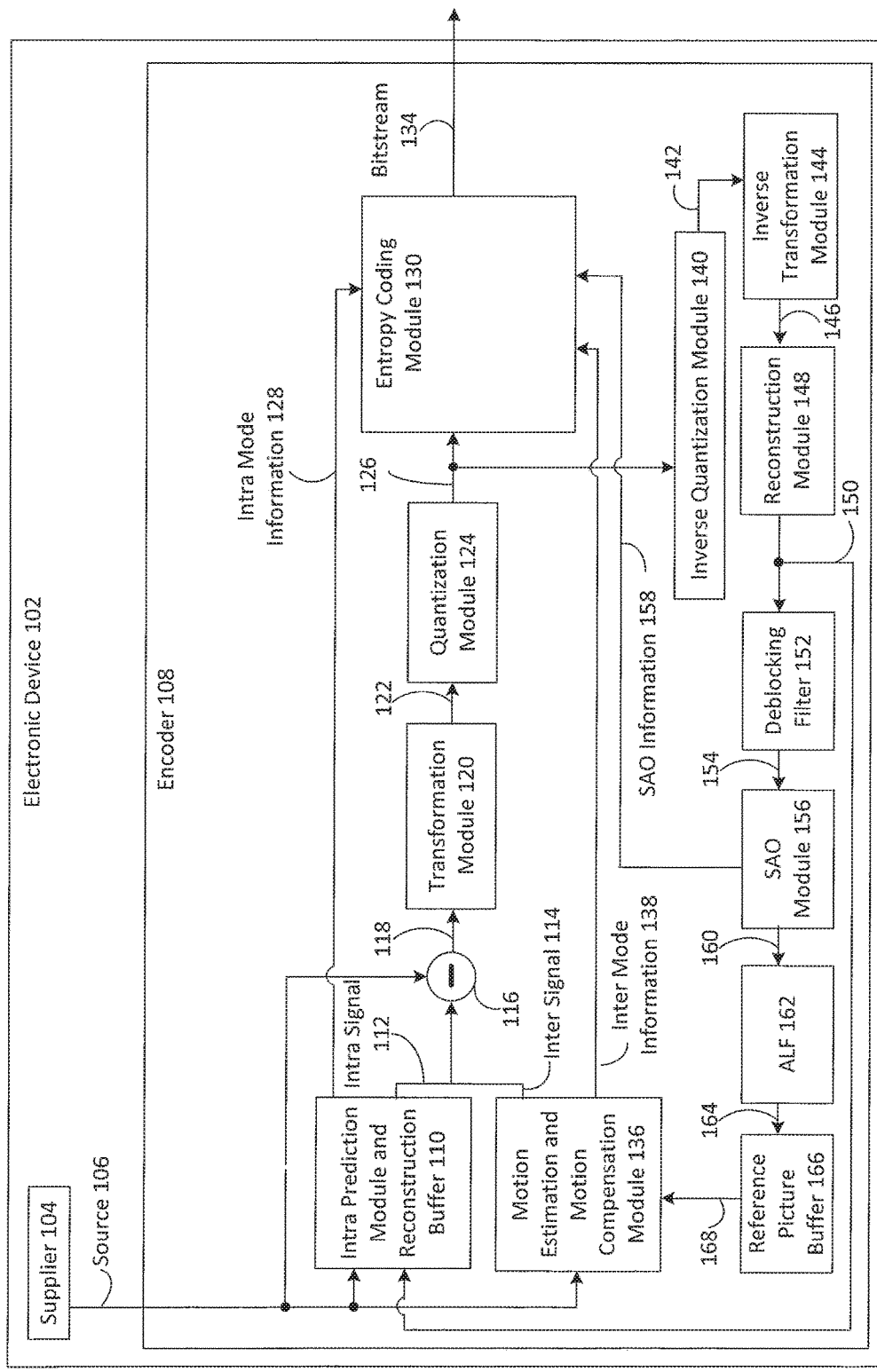
FIG. 1 is a block diagram illustrating one configuration of an electronic device including a HEVC encoder.

The Joint Collaborative Team on Video Coding (JCT-VC) of the International Telecommunication Union Telecommunication Standardization Sector (ITU-T) Study Group 16 (SG16) Working Party 3 (WP3) and International Organization for Standardization/International Electrotechnical Commission (ISO/IEC) Joint Technical Committee 1/Subcommittee 29/Working Group 11 (JTC1/SC29/WG11) has launched a standardization effort for a video coding standard called the High Efficiency Video Coding standard (HEVC). HEVC uses block-based coding.

In HEVC, an entropy coding technique Context-Adaptive Binary Arithmetic Coding CABAC)) is used to compress Transformed and Quantized Coefficients (TQCs) without loss. TQCs may be from different block sizes according to transform sizes (e.g., 4×4, 8×8, 16×16, 32×32).

Two-dimensional (2D) TQCs may be converted into a one-dimensional (1D) array before entropy coding. In one example, 2D arrayed TQCs in a 4×4 block may be arranged as illustrated in Table (1).

TABLE 1

| 4  | 0   | 1   | 0   |
|----|-----|-----|-----|
| 3  | 2   | −1  | ... |
| −3 | 0   | ... | ... |
| 0  | ... | ... | ... |

When converting the 2D TQCs into a 1D array, the block may be scanned in a diagonal zig-zag fashion. Continuing with the example, the 2D arrayed TQCs illustrated in Table (1) may be converted into 1D arrayed TQCs [4, 0, 3, −3, 2, 1, 0, −1, 0, . . . ] by scanning the first row and first column, first row and second column, second row and first column, third row and first column, second row and second column, first row and third column, first row and fourth column, second row and third column, third row and second column, fourth row and first column and so on.

The coding procedure in HEVC may proceed, for example, as follows. The TQCs in the 1D array may be ordered according to scanning position. The scanning position of the last significant coefficient and the last coefficient level may be determined. The last significant coefficient may be coded. It should be noted that coefficients are typically coded in reverse scanning order. Run-level coding may be performed, which encodes information about runs of identical numbers and/or bits rather than encoding the numbers themselves, which is activated directly after the last coefficient coding. Then, level coding may be performed. The term significant coefficient refers to a coefficient that has a coefficient level value that is greater than zero. A coefficient level value refers to a unique indicator of the magnitude (or absolute value) of a Transformed and Quantized Coefficient (TQC) value.

This procedure may be illustrated in Table (2) as a continuation of the example above (with the 1D arrayed TQCs [4, 0, 3, −3, 2, 1, 0, −1, 0, . . . ]).

TABLE 2

|  | Scanning Position | | | | | | | | |
|---|---|---|---|---|---|---|---|---|---|
|  | 0 | 1 | 2 | 3 | 4 | 5 | 6 | 7 | ... |
|  | | | | Coefficient Level | | | | | |
|  | 4 | 0 | 3 | −3 | 2 | 1 | 0 | −1 | ... |
| Last Position | | | | | | | | 7 | |
| Last Coefficient Level | | | | | | | | −1 | |
| Run-Level Coding | | | | | 2 | 1 | 0 | | |
| Level Coding | 4 | 0 | 3 | −3 | | | | | |

In Table (2), for example, the coefficient level −1 at scanning position 7 may be the last non-zero coefficient. Thus, the last position is scanning position 7 and the last coefficient level is −1. Run-level coding may be performed for coefficients 0, 1 and 2 at scanning positions 6, 5 and 4 (where coefficients are coded in reverse scanning order). Then, level coding may be performed for the coefficient levels −3, 3, 0 and 4.

FIG. 1 is a block diagram illustrating one configuration of an electronic device 102 in which video may be coded. It should be noted that one or more of the elements illustrated as included within the electronic device 102 may be implemented in hardware, software, or a combination of both. For example, the electronic device 102 includes a encoder 108, which may be implemented in hardware, software or a combination of both. For instance, the encoder 108 may be implemented as a circuit, integrated circuit, application-specific integrated circuit (ASIC), processor in electronic communication with memory with executable instructions, firmware, field-programmable gate array (FPGA), etc., or a combination thereof. In some configurations, the encoder 108 may be a high efficiency video coding (HEVC) coder.

The electronic device 102 may include a supplier 104. The supplier 104 may provide picture or image data (e.g., video) as a source 106 to the encoder 108. Examples of the supplier 104 include image sensors, memory, communication interfaces, network interfaces, wireless receivers, ports, etc.

The source 106 may be provided to an intra-frame prediction module and reconstruction buffer 110. The source 106 may also be provided to a motion estimation and motion compensation module 136 and to a subtraction module 116.

The intra-frame prediction module and reconstruction buffer 110 may generate intra mode information 128 and an intra signal 112 based on the source 106 and reconstructed data 150. The motion estimation and motion compensation module 136 may generate inter mode information 138 and an inter signal 114 based on the source 106 and a reference picture buffer 166 signal 168. The reference picture buffer 166 signal 168 may include data from one or more reference pictures stored in the reference picture buffer 166.

The encoder 108 may select between the intra signal 112 and the inter signal 114 in accordance with a mode. The intra signal 112 may be used in order to exploit spatial characteristics within a picture in an intra coding mode. The inter signal 114 may be used in order to exploit temporal characteristics between pictures in an inter coding mode. While in the intra coding mode, the intra signal 112 may be provided to the subtraction module 116 and the intra mode information 128 may be provided to an entropy coding module 130. While in the inter coding mode, the inter signal 114 may be provided to the subtraction module 116 and the inter mode information 138 may be provided to the entropy coding module 130.

Either the intra signal 112 or the inter signal 114 (depending on the mode) is subtracted from the source 106 at the subtraction module 116 in order to produce a prediction residual 118. The prediction residual 118 is provided to a transformation module 120. The transformation module 120 may compress the prediction residual 118 to produce a transformed signal 122 that is provided to a quantization module 124. The quantization module 124 quantizes the transformed signal 122 to produce transformed and quantized coefficients (TQCs) 126.

The TQCs 126 are provided to an entropy coding module 130 and an inverse quantization module 140. The inverse quantization module 140 performs inverse quantization on the TQCs 126 to produce an inverse quantized signal 142 that is provided to an inverse transformation module 144. The inverse transformation module 144 decompresses the inverse quantized signal 142 to produce a decompressed signal 146 that is provided to a reconstruction module 148.

The reconstruction module 148 may produce reconstructed data 150 based on the decompressed signal 146. For example, the reconstruction module 148 may reconstruct (modified) pictures. The reconstructed data 150 may be provided to a deblocking filter 152 and to the intra prediction module and reconstruction buffer 110. The deblocking filter 152 may produce a filtered signal 154 based on the reconstructed data 150.

The filtered signal 154 may be provided to a sample adaptive offset (SAO) module 156. The SAO module 156 may produce SAO information 158 that is provided to the entropy coding module 130 and an SAO signal 160 that is provided to an adaptive loop filter (ALF) 162. The ALF 162 produces an ALF signal 164 that is provided to the reference picture buffer 166. The ALF signal 164 may include data from one or more pictures that may be used as reference pictures. In some cases the ALF 162 may be omitted.

The entropy coding module 130 may code the TQCs 126 to produce a bitstream 134. As described above, the TQCs 126 may be converted to a 1D array before entropy coding. Also, the entropy coding module 130 may code the TQCs 126 using CAVLC or CABAC. In particular, the entropy coding module 130 may code the TQCs 126 based on one or more of intra mode information 128, inter mode information 138 and SAO information 158. The bitstream 134 may include coded picture data.

Quantization, involved in video compression such as HEVC, is a lossy compression technique achieved by compressing a range of values to a single quantum value. The quantization parameter (QP) is a predefined scaling parameter used to perform the quantization based on both the quality of reconstructed video and compression ratio. The block type is defined in HEVC to represent the characteristics of a given block based on the block size and its color information. QP, resolution information and block type may be determined before entropy coding. For example, the electronic device 102 (e.g., the encoder 108) may determine the QP, resolution information and block type, which may be provided to the entropy coding module 130.

The entropy coding module 130 may determine the block size based on a block of TQCs 126. For example, block size may be the number of TQCs 126 along one dimension of the block of TQCs. In other words, the number of TQCs 126 in the block of TQCs may be equal to block size squared. In addition, the block may be non-square where the number of TQCs 126 is the height times the width of the block. For instance, block size may be determined as the square root of the number of TQCs 126 in the block of TQCs. Resolution may be defined as a pixel width by a pixel height. Resolution information may include a number of pixels for the width of a picture, for the height of a picture or both. Block size may be defined as the number of TQCs along one dimension of a 2D block of TQCs.

In some configurations, the bitstream 134 may be transmitted to another electronic device. For example, the bitstream 134 may be provided to a communication interface, network interface, wireless transmitter, port, etc. For instance, the bitstream 134 may be transmitted to another electronic device via a Local Area Network (LAN), the Internet, a cellular phone base station, etc. The bitstream 134 may additionally or alternatively be stored in memory on the electronic device 102.

Figure 2:
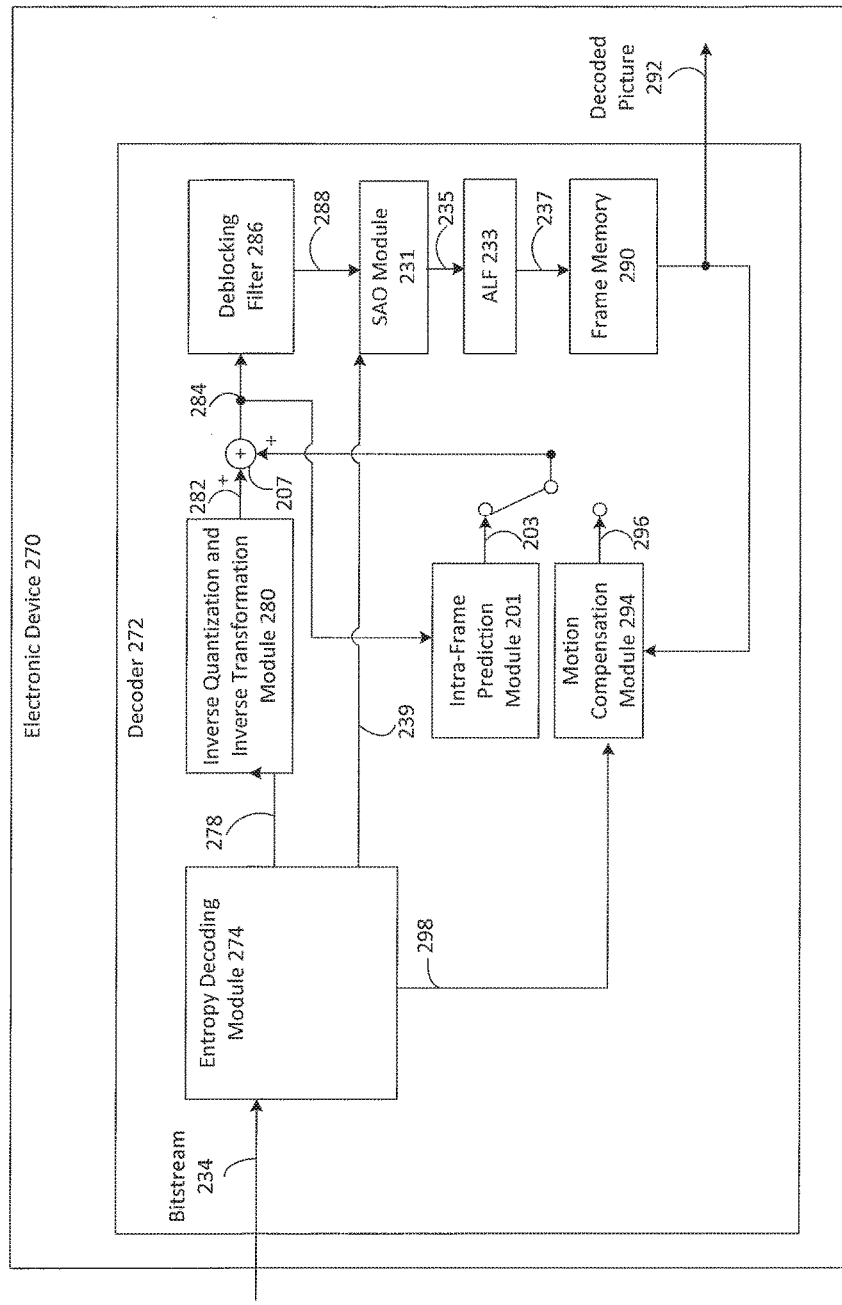
FIG. 2 is a block diagram illustrating one configuration of an electronic device including a HEVC decoder.

FIG. 2 is a block diagram illustrating one configuration of an electronic device 270 including a decoder 272 that may be a high-efficiency video coding (HEVC) decoder. The decoder 272 and one or more of the elements illustrated as included in the decoder 272 may be implemented in hardware, software or a combination of both. The decoder 272 may receive a bitstream 234 (e.g., one or more coded pictures included in the bitstream 234) for decoding. In some configurations, the received bitstream 234 may include received overhead information, such as a received slice header, received picture parameter set (PPS), received buffer description information, classification indicator, etc.

Received symbols (e.g., encoded TQCs) from the bitstream 234 may be entropy decoded by an entropy decoding module 274. This may produce a motion information signal 298 and decoded transformed and quantized coefficients (TQCs) 278.

The motion information signal 298 may be combined with a portion of a decoded picture 292 from a frame memory 290 at a motion compensation module 294, which may produce an inter-frame prediction signal 296. The decoded transformed and quantized coefficients (TQCs) 278 may be inverse quantized and inverse transformed by an inverse quantization and inverse transformation module 280, thereby producing a decoded residual signal 282. The decoded residual signal 282 may be added to a prediction signal 205 by a summation module 207 to produce a combined signal 284. The prediction signal 205 may be a signal selected from either the inter-frame prediction signal 296 produced by the motion compensation module 294 or an intra-frame prediction signal 203 produced by an intra-frame prediction module 201. In some configurations, this signal selection may be based on (e.g., controlled by) the bitstream 234.

The intra-frame prediction signal 203 may be predicted from previously decoded information from the combined signal 284 (in the current frame, for example). The combined signal 284 may also be filtered by a deblocking filter 286. The resulting filtered signal 288 may be provided to a sample adaptive offset (SAO) module 231. Based on the filtered signal 288 and information 239 from the entropy decoding module 274, the SAO module 231 may produce an SAO signal 235 that is provided to an adaptive loop filter (ALF) 233. The ALF 233 produces an ALF signal 237 that is provided to the frame memory 290. The ALF signal 237 may include data from one or more pictures that may be used as reference pictures. The ALF signal 237 may be written to frame memory 290. The resulting ALF signal 237 may include a decoded picture. In some cases the ALF 233 may be omitted.

The frame memory 290 may include a decoded picture buffer (DPB). The frame memory 290 may also include overhead information corresponding to the decoded pictures. For example, the frame memory 290 may include slice headers, picture parameter set (PPS) information, cycle parameters, buffer description information, etc. One or more of these pieces of information may be signaled from a coder (e.g., encoder 108).

The frame memory 290 may provide one or more decoded pictures 292 to the motion compensation module 294. Furthermore, the frame memory 290 may provide one or more decoded pictures 292, which may be output from the decoder 272. The one or more decoded pictures 292 may be presented on a display, stored in memory or transmitted to another device, for example.

Figure 3:
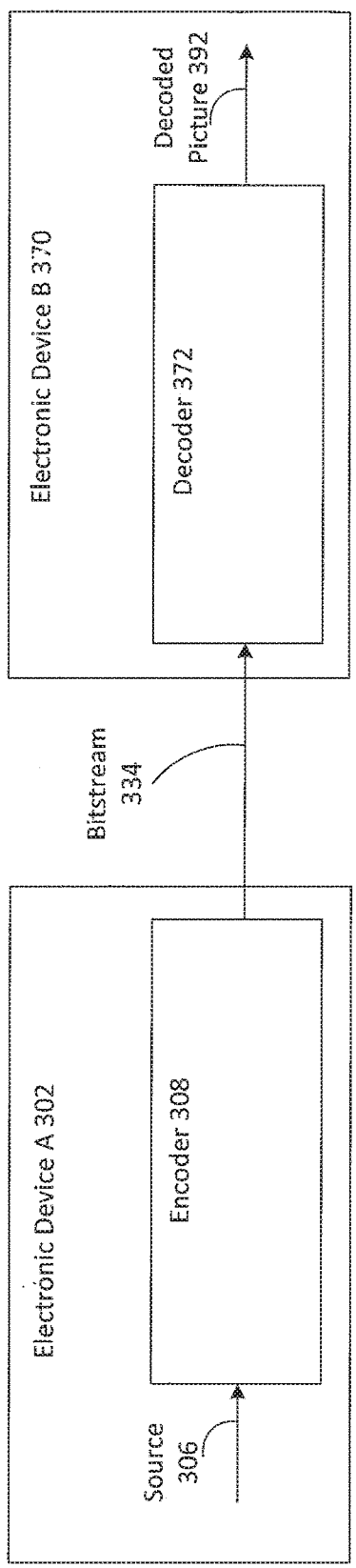
FIG. 3 is a block diagram illustrating one example of an encoder and a decoder.

FIG. 3 is a block diagram illustrating one example of an encoder 308 and a decoder 372. In this example, electronic device A 302 and electronic device B 370 are illustrated. However, it should be noted that the features and functionality described in relation to electronic device A 302 and electronic device B 370 may be combined into a single electronic device in some configurations.

Electronic device A 302 includes the encoder 308. The encoder 308 may be implemented in hardware, software or a combination of both. In one configuration, the encoder 308 may be a high-efficiency video coding (HEVC) coder. Other coders may likewise be used. Electronic device A 302 may obtain a source 306. In some configurations, the source 306 may be captured on electronic device A 302 using an image sensor, retrieved from memory or received from another electronic device.

The encoder 308 may code the source 306 to produce a bitstream 334. For example, the encoder 308 may code a series of pictures (e.g., video) in the source 306. The encoder 308 may be similar to the encoder 108 described above in connection with FIG. 1.

The bitstream 334 may include coded picture data based on the source 306. In some configurations, the bitstream 334 may also include overhead data, such as slice header information, PPS information, etc. As additional pictures in the source 306 are coded, the bitstream 334 may include one or more coded pictures.

The bitstream 334 may be provided to the decoder 372. In one example, the bitstream 334 may be transmitted to electronic device B 370 using a wired or wireless link. In some cases, this may be done over a network, such as the Internet or a Local Area Network (LAN). As illustrated in FIG. 3, the decoder 372 may be implemented on electronic device B 370 separately from the encoder 308 on electronic device A 302. However, it should be noted that the encoder 308 and decoder 3721 may be implemented on the same electronic device in some configurations. In an implementation where the encoder 308 and decoder 372 are implemented on the same electronic device, for instance, the bitstream 334 may be provided over a bus to the decoder 372 or stored in memory for retrieval by the decoder 372.

The decoder 372 may be implemented in hardware, software or a combination of both. In one configuration, the decoder 372 may be a high-efficiency video coding (HEVC) decoder. Other decoders may likewise be used. The decoder 372 may be similar to the decoder 272 described above in connection with FIG. 2.

Figure 4:
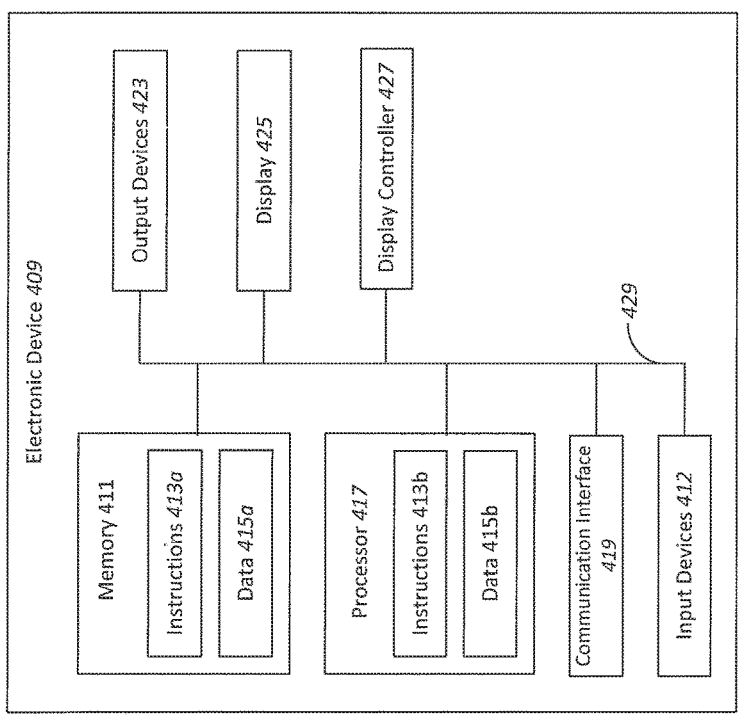
FIG. 4 illustrates various components that may be utilized in an electronic device.

FIG. 4 illustrates various components that may be utilized in an electronic device 409. The electronic device 409 may be implemented as one or more of the electronic devices. For example, the electronic device 409 may be implemented as the electronic device 102 described above in connection with FIG. 1, as the electronic device 270 described above in connection with FIG. 2, or both.

The electronic device 409 includes a processor 417 that controls operation of the electronic device 409. The processor 417 may also be referred to as a CPU. Memory 411, which may include both read-only memory (ROM), random access memory (RAM) or any type of device that may store information, provides instructions 413*a* (e.g., executable instructions) and data 415*a* to the processor 417. A portion of the memory 411 may also include non-volatile random access memory (NVRAM). The memory 411 may be in electronic communication with the processor 417.

Instructions 413*b* and data 415*b* may also reside in the processor 417. Instructions 413*b* and/or data 415*b* loaded into the processor 417 may also include instructions 413*a* and/or data 415*a* from memory 411 that were loaded for execution or processing by the processor 417. The instructions 413*b* may be executed by the processor 417 to implement one or more techniques disclosed herein.

The electronic device 409 may include one or more communication interfaces 419 for communicating with other electronic devices. The communication interfaces 419 may be based on wired communication technology, wireless communication technology, or both. Examples of communication interfaces 419 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, a wireless transceiver in accordance with $3^{rd}$ Generation Partnership Project (3GPP) specifications and so forth.

The electronic device 409 may include one or more output devices 423 and one or more input devices 421. Examples of output devices 423 include a speaker, printer, etc. One type of output device that may be included in an electronic device 409 is a display device 425. Display devices 425 used with configurations disclosed herein may utilize any suitable image projection technology, such as a cathode ray tube (CRT), liquid crystal display (LCD), light-emitting diode (LED), gas plasma, electroluminescence or the like. A display controller 427 may be provided for converting data stored in the memory 411 into text, graphics, and/or moving images (as appropriate) shown on the display 425. Examples of input devices 421 include a keyboard, mouse, microphone, remote control device, button, joystick, trackball, touchpad, touchscreen, lightpen, etc.

The various components of the electronic device 409 are coupled together by a bus system 429, which may include a power bus, a control signal bus and a status signal bus, in addition to a data bus. However, for the sake of clarity, the various buses are illustrated in FIG. 4 as the bus system 429. The electronic device 409 illustrated in FIG. 4 is a functional block diagram rather than a listing of specific components.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. The code for the decoder and/or encoder may be stored on a computer readable medium.

An input picture comprising a plurality of coded tree blocks (e.g., generally referred to herein as blocks) may be partitioned into one or several slices. The values of the samples in the area of the picture that a slice represents may be properly decoded without the use of data from other slices provided that the reference pictures used at the encoder and the decoder are the same and that de-blocking filtering does not use information across slice boundaries. Therefore, entropy decoding and block reconstruction for a slice does not depend on other slices. In particular, the entropy coding state may be reset at the start of each slice. The data in other slices may be marked as unavailable when defining neighborhood availability for both entropy decoding and reconstruction. The slices may be entropy decoded and reconstructed in parallel. No intra prediction and motion-vector prediction is preferably allowed across the boundary of a slice. In contrast, de-blocking filtering may use information across slice boundaries.

Figure 5:
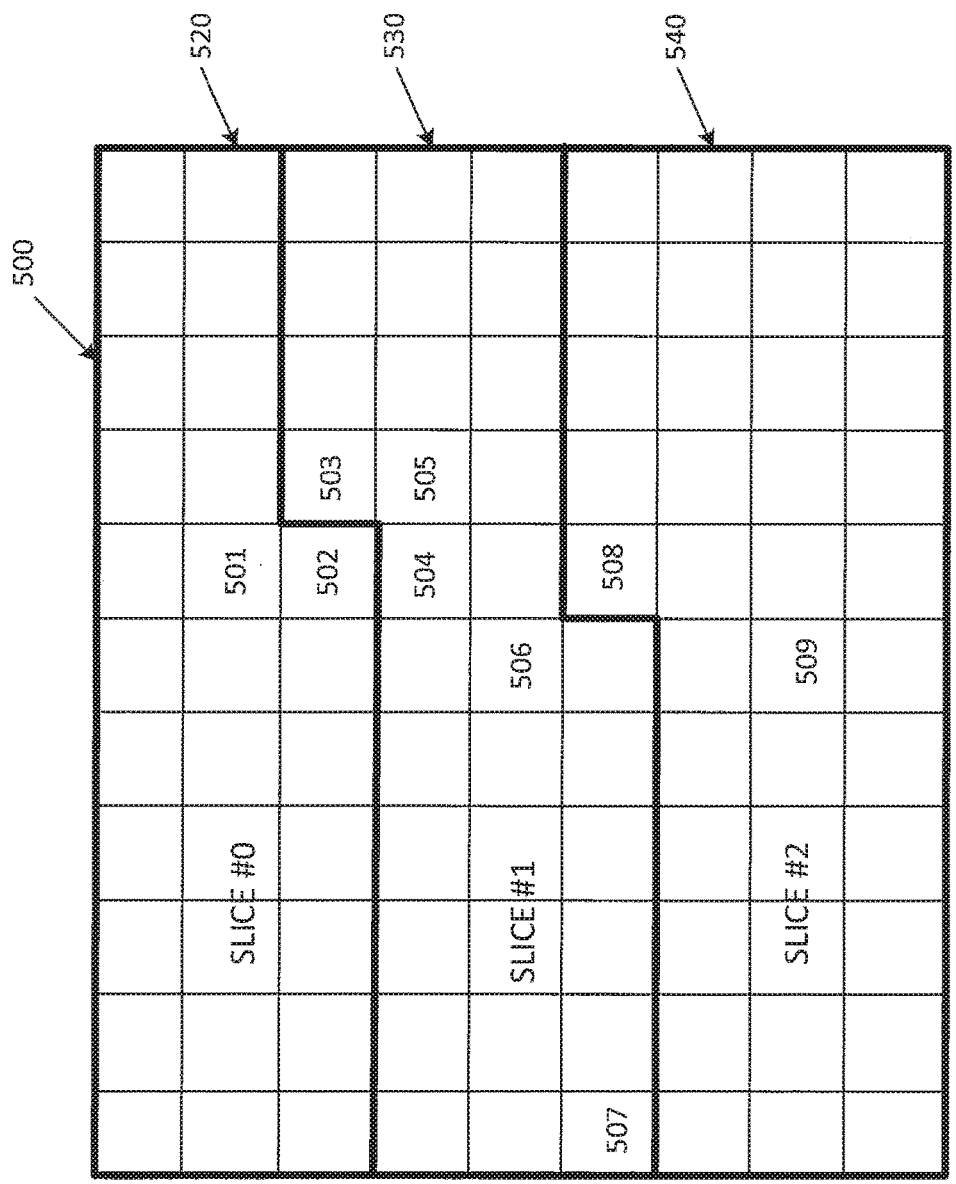
FIG. 5 illustrates an exemplary slice structure.

FIG. 5 illustrates an exemplary video picture 500 comprising eleven blocks in the horizontal direction and nine blocks in the vertical direction (nine exemplary blocks labeled 501-509). FIG. 5 illustrates three exemplary slices: a first slice denoted "SLICE #0" 520, a second slice denoted "SLICE #1" 530 and a third slice denoted "SLICE #2" 540. The decoder may decode and reconstruct the three slices 520, 530, 540, in parallel. Each of the slices may be transmitted in scan line order in a sequential manner. At the beginning of the decoding/reconstruction process for each slice, context models are initialized or reset and blocks in other slices are marked as unavailable for both entropy decoding and block reconstruction. The context model generally represents the state of the entropy encoder and/or decoder. Thus, for a block, for example, the block labeled 503, in "SLICE #1", blocks (for example, blocks labeled 501 and 502) in "SLICE #0" may not be used for context model selection or reconstruction. Whereas, for a block, for example, the block labeled 505, in "SLICE #1," other blocks (for example, blocks labeled 503 and 504) in "SLICE #1" may be used for context model selection or reconstruction. Therefore, entropy decoding and block reconstruction proceeds serially within a slice. Unless slices are defined using a flexible block ordering (FMO), blocks within a slice are processed in the order of a raster scan.

Figure 6:
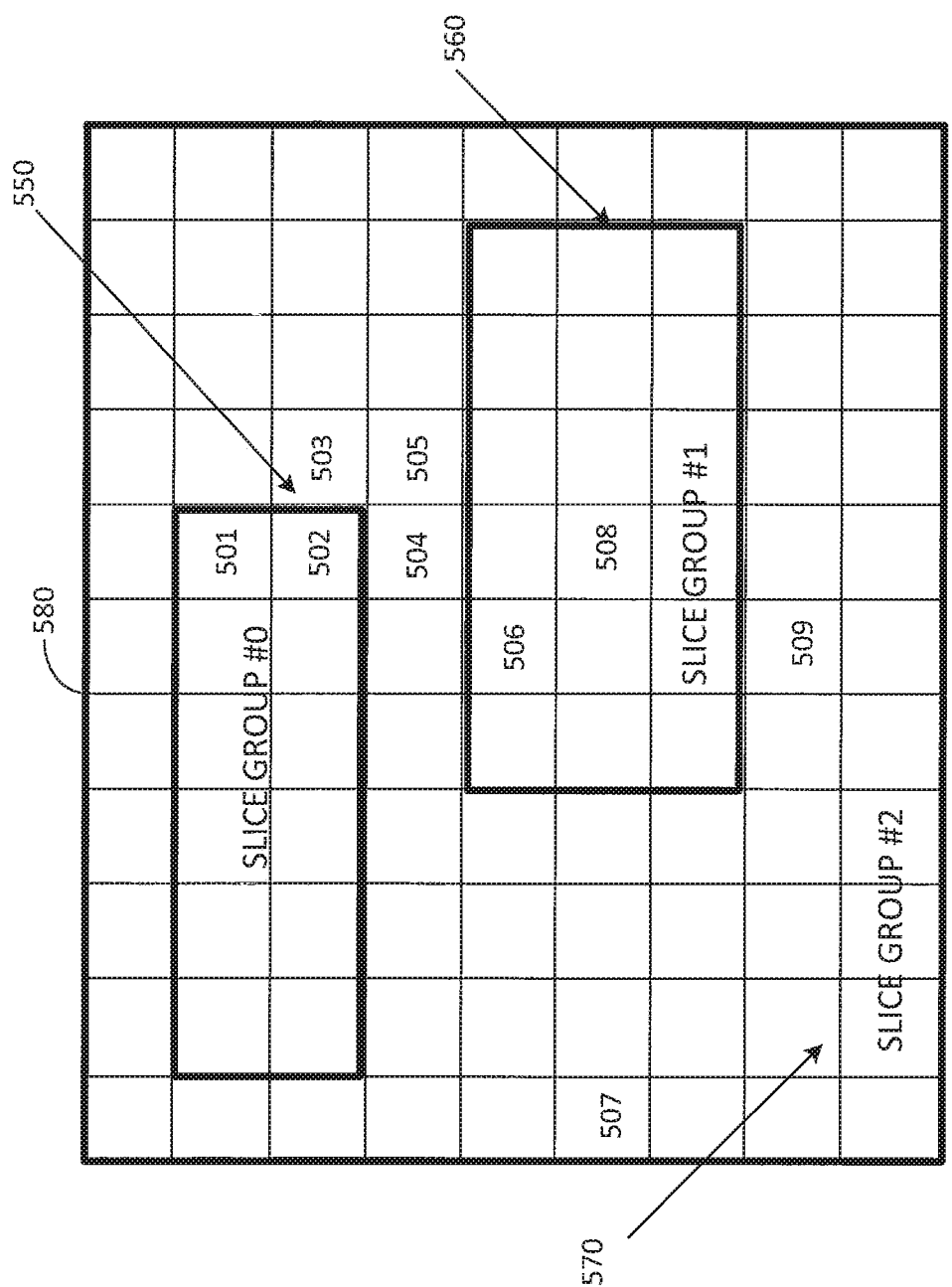
FIG. 6 illustrates another exemplary slice structure.

FIG. 6 depicts an exemplary block allocation into three slice groups: a first slice group denoted "SLICE GROUP #0" 550, a second slice group denoted "SLICE GROUP #1" 560 and a third slice group denoted "SLICE GROUP #2" 570. These slice groups 550, 560, 570, may be associated with two foreground regions and a background region, respectively, in the picture 580.

The arrangement of slices, as illustrated in FIG. 5, may be limited to defining each slice between a pair of blocks in the image scan order, also known as raster scan or a raster scan order. This arrangement of scan order slices is computationally efficient but does not tend to lend itself to the highly efficient parallel encoding and decoding. Moreover, this scan order definition of slices also does not tend to group smaller localized regions of the image together that are likely to have common characteristics highly suitable for coding efficiency. The arrangement of slices, as illustrated in FIG. 6, is highly flexible in its arrangement but does not tend to lend itself to high efficient parallel encoding or decoding. Moreover, this highly flexible definition of slices is computationally complex to implement in a decoder.

Figure 7:
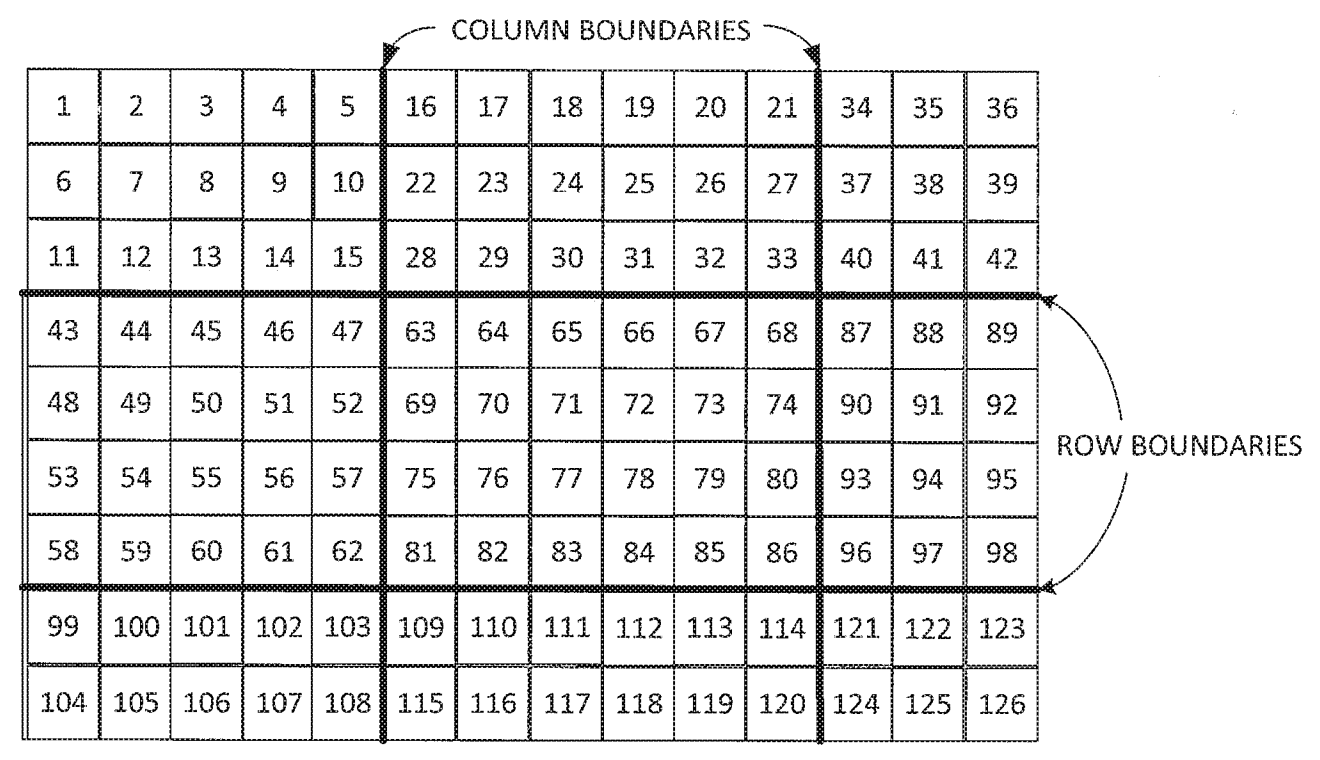

Referring to FIG. 7, a tile technique divides an image into a set of rectangular (inclusive of square) regions. The blocks (alternatively referred to as largest coding units or coded treeblocks in some systems) within each of the tiles are encoded and decoded in a raster scan order. The arrangement of tiles are likewise encoded and decoded in a raster scan order. Accordingly, there may be any suitable number of column boundaries (e.g., 0 or more) and there may be any suitable number of row boundaries (e.g., 0 or more). Thus, the frame may define one or more slices, such as the one slice illustrated in FIG. 7. In some embodiments, blocks located in different tiles are not available for intra-prediction, motion compensation, entropy coding context selection or other processes that rely on neighboring block information.

Figure 8:
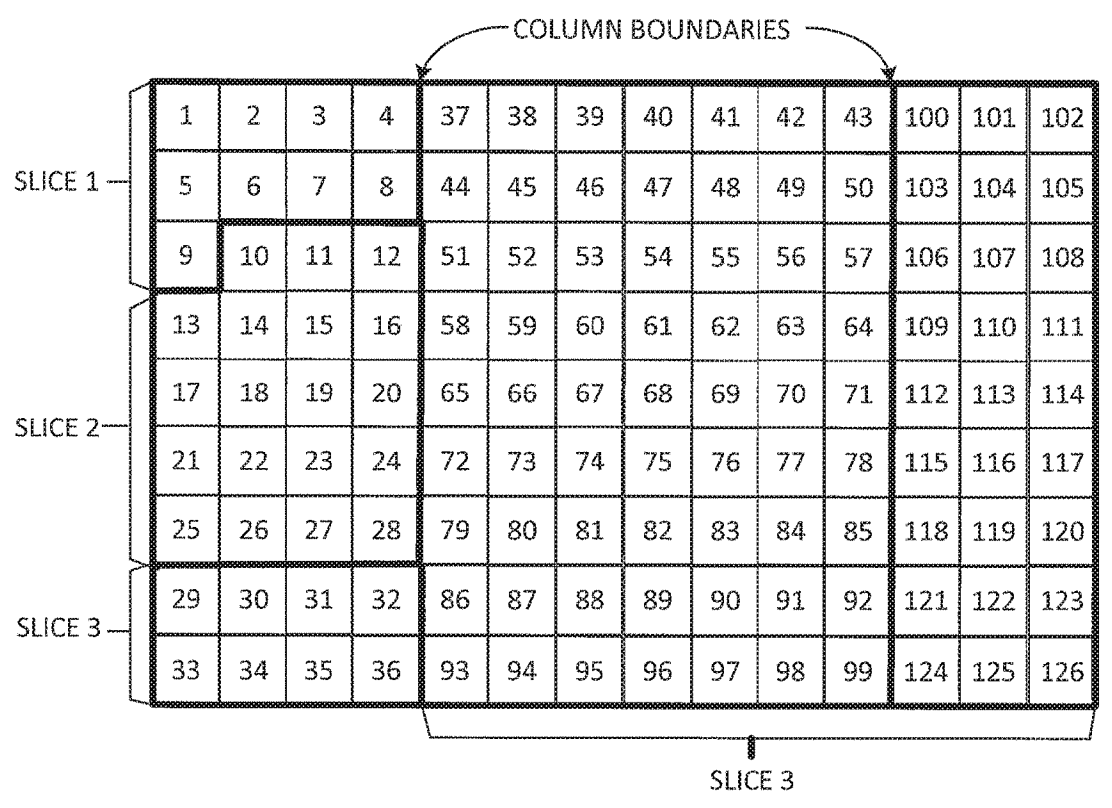

Referring to FIG. 8, the tile technique is shown dividing an image into a set of three rectangular columns. The blocks (alternatively referred to as largest coding units or coded treeblocks in some systems) within each of the tiles are encoded and decoded in a raster scan order. The tiles are likewise encoded and decoded in a raster scan order. One or more slices may be defined in the scan order of the tiles. Each of the slices are independently decodable. For example, slice 1 may be defined as including blocks 1-9, slice 2 may be defined as including blocks 10-28, and slice 3 may be defined as including blocks 29-126 which spans three tiles. The use of tiles facilitates coding efficiency by processing data in more localized regions of a frame.

It is to be understood that in some cases the video coding may optionally not include tiles, and may optionally include the use of a wavefront encoding/decoding pattern for the frames of the video. In this manner, one or more lines of the video (such as a plurality of groups of one or more rows of macroblocks (or alternatively coded tree blocks), each of which group being representative of a wavefront substream may be encoded/decoded in a parallel fashion. In general, the partitioning of the video may be constructed in any suitable manner.

Video coding standards often compress video data for transmission over a channel with limited frequency bandwidth and/or limited storage capacity. These video coding standards may include multiple coding stages such as intra prediction, transform from spatial domain to frequency domain, quantization, entropy coding, motion estimation, and motion compensation, in order to more effectively encode and decode frames. Many of the coding and decoding stages are unduly computationally complex.

The bitstream of the video may include a syntax structure that is placed into logical data packets generally referred to as Network Abstraction Layer (NAL) units. Each NAL unit includes a NAL unit header, such as a two-byte NAL unit header (e.g., 16 bits), to identify the purpose of the associated data payload. For example, each coded slice (and/or picture) may be coded in one or more slice (and/or picture) NAL units. Other NAL units may be included for other categories of data, such as for example, supplemental enhancement information, coded slice of temporal sub-layer access (TSA) picture, coded slice of step-wise temporal sub-layer access (STSA) picture, coded slice a non-TSA, non-STSA trailing picture, coded slice of broken link access picture, coded slice of instantaneous decoded refresh picture, coded slice of clean random access picture, coded slice of decodable leading picture, coded slice of tagged for discard picture, video parameter set, sequence parameter set, picture parameter set, access unit delimiter, end of sequence, end of bitstream, filler data, and/or sequence enhancement information message. Table 1 below illustrates one example of NAL unit codes and NAL unit type classes. Other NAL unit types may be included, as desired. It should also be understood that the NAL unit type values for the NAL units shown in the Table 1 may be reshuffled and reassigned. Also additional NAL unit types may be added. Also some NAL unit types may be removed.

TABLE 1

NAL unit type codes and NAL unit type classes

| nal_unit_type | Name of nal_unit_type | Content of NAL unit and RBSP syntax structure | NAL unit type class |
|---|---|---|---|
| 0 | UNSPEC0 | Unspecified | non-VCL |
| 1, 2 | TRAIL_R, TRAIL_N | Coded slice of a non-TSA, non-STSA trailing picture slice_layer_rbsp( ) | VCL |
| 3, 4 | TSA_R, TSA_N | Coded slice of a TSA picture slice_layer_rbsp( ) | VCL |
| 5, 6 | STSA_R, STSA_N | Coded slice of an STSA picture slice_layer_rbsp( ) | VCL |
| 7, 8, 9 | BLA_W_LP BLA_W_DLP BLA_N_LP | Coded slice of a BLA picture slice_layer_rbsp( ) | VCL |
| 10, 11 | IDR_W_DLP IDR_N_LP | Coded slice of an IDR picture slice_layer_rbsp( ) | VCL |
| 12 | CRA_NUT | Coded slice of a CRA picture slice_layer_rbsp( ) | VCL |
| 13 | DLP_NUT | Coded slice of a DLP picture slice_layer_rbsp( ) | VCL |
| 14 | TFD_NUT | Coded slice of a TFD picture slice_layer_rbsp( ) | VCL |
| 15 ... 20 | RSV_VCL15 ... RSV_VCL20 | Reserved | VCL |
| 21 ... 24 | RSV_NVCL21 ... RSV_NVCL24 | Reserved | non-VCL |
| 25 | VPS_NUT | Video parameter set video_parameter_set_rbsp( ) | non-VCL |
| 26 | SPS_NUT | Sequence parameter set seq_parameter_set_rbsp( ) | non-VCL |
| 27 | PPS_NUT | Picture parameter set pic_parameter_set_rbsp( ) | non-VCL |

TABLE 1-continued

NAL unit type codes and NAL unit type classes

| nal_unit_type | Name of nal_unit_type | Content of NAL unit and RBSP syntax structure | NAL unit type class |
|---|---|---|---|
| 28 | AUD_NUT | Access unit delimiter access_unit_delimiter_rbsp( ) | non-VCL |
| 29 | EOS_NUT | End of sequence end_of_seq_rbsp( ) | non-VCL |
| 30 | EOB_NUT | End of bitsteam end_of_bitstream_rbsp( ) | non-VCL |
| 31 | FD_NUT | Filler data filler_data_rbsp( ) | non-VCL |
| 32 | SEI_NUT | Supplemental enhancement information(SEI) sei_rbsp( ) | non-VCL |
| 33 ... 47 | RSV_NVCL33 ... RSV_NVCL47 | Reserved | non-VCL |
| 48 ... 63 | UNSPEC48 ... UNSPEC63 | Unspecified | non-VCL |

The NAL provides the capability to map the video coding layer (VCL) data that represents the content of the pictures onto various transport layers. The NAL units may be classified into VCL and non-VCL NAL units according to whether they contain coded picture or other associated data, respectively. B. Bros, W-J. Han, J-R. Ohm, G. J. Sullivan, and T-. Wiegand, "High efficiency video coding (HEVC) text specification draft 8," JCTVC-J10003, Stockholm, July 2012 is hereby incorporated by reference herein in their entirety.

To enable random access and bitstream splicing an IDR access unit contains an intra picture, namely, a coded picture that can be decoded without decoding any previous pictures in the NAL unit stream. Also, the presence of an IDR access unit indicates that no subsequent picture in the bitstream will require reference to pictures prior to the intra picture that it contains in order to be decoded.

The clean random access (CRA) picture syntax specifies the use of an intra picture at the location of a random access point (RAP), i.e. a location in a bitstream at which a decoder can begin successfully decoding pictures without needing to decode any pictures that appeared earlier in the bitstream. The support of random access enables effective channel switching, seek operations, and dynamic streaming services. Some pictures that follow a CRA picture in decoding order and precede it in display order (output order) may contain inter-picture prediction references to pictures that are not available at the decoder when starting decoding at the CRA picture. These non-decodable pictures are discarded by a decoder that starts its decoding process at a CRA point. Such non-decodable pictures are identified as tagged for discard (TFD) pictures. The location of splice points from different original coded bitstreams can be indicated by broken link access (BLA) pictures. A bitstream splicing operation can be performed by changing the NAL unit type of a CRA picture in one bitstream to the value that indicates a BLA picture and concatenating the new bitstream at the position of a RAP picture in the other bitstream. A RAP picture may be an IDR, a CRA, or a BLA picture, and both the CRA and BLA pictures may be followed by TFD pictures in the bitstream (depending on the particular value of the NAL unit type used for a BLA picture) and concatenating the new bitstream at the position of a RAP picture in the other bitstream. Any TFD pictures associated with a BLA picture are discarded by the decoder, as they may contain references to pictures that are not actually present in the bitstream due to a splicing operation. The other type of picture that can follow a RAP picture in decoding order and precede it in output order is the decodable leading picture (DLP), which cannot contain references to any pictures that precede the RAP picture in decoding order. TFD and DLP pictures are collectively referred to as leading pictures (LPs). Pictures that follow a RAP picture in both decoding order and output order, are known as trailing pictures, which cannot contain references to LPs for inter-picture prediction.

For multiple-reference picture management, a particular set of previously-decoded pictures needs to be present in the decoded picture buffer (DPB) (see, reference picture buffer 166 of FIG. 1 and frame memory 290 of FIG. 2) for the decoding of the remainder of the pictures in the bitstream. To identify these pictures, a list of picture order count (POC) identifiers is transmitted in each slice header. The pic_order_cnt_lsb syntax element specifies the picture order count modulo MaxPicOrderCntLsb for the current picture. The length of the pic_order_cntlsb syntax element is log 2_max_pic_order_cnt_lsb_minus4+4 bits. The value of the pic_order_cnt_lsb is in the range of 0 to MaxPicOrderCntLsb ... 1, inclusive. The log 2_max_pic_order_cnt_lsb_minus4 specifies the value of the variable MaxPicOrderCntLsb that is used in the decoding process for picture order count as follows:

$$MaxPicOrderCntLsb = 2^{(log\ 2\_max\_pic\_order\_cnt\_lsb\_minus4+4)} \quad (0\text{-}1)$$

The value of log 2_max_pic_order_cnt_lsb_minus4 is in the range of 0 to 12, inclusive.

Figure 9:
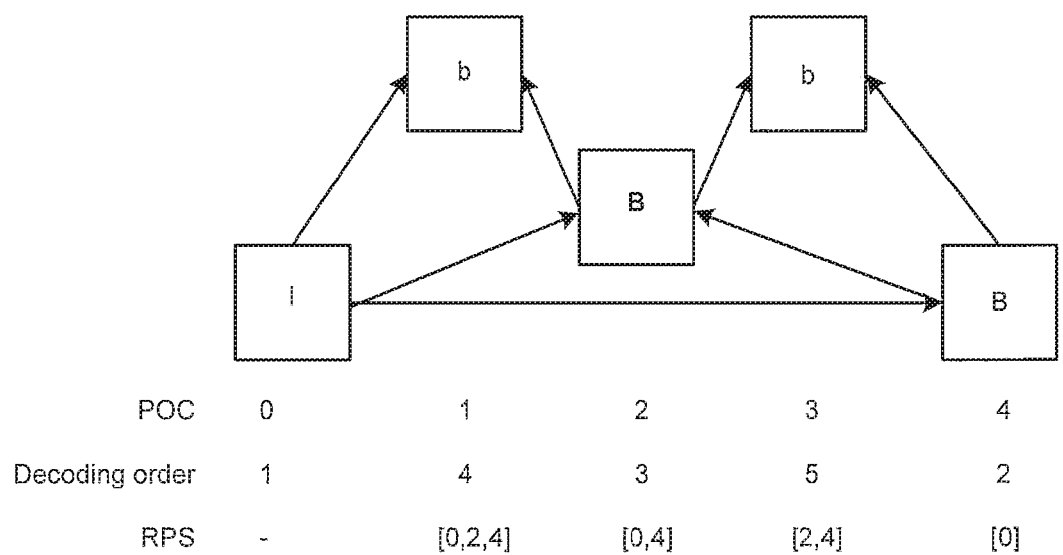
FIG. 9 illustrates POC, decoding order, and RPS.

Reference picture set (RPS) is a set of reference pictures associated with a picture, consisting of all reference pictures that are prior to the associated picture in decoding order, that may be used for inter prediction of the associated picture or any picture following the associated picture in decoding order. FIG. 9 illustrates exemplary POC values, decoding order, and RPS for a temporal prediction structure. In this example the RPS values shown refer to the actual POC values for the RPS. In other cases instead of POC values a difference of POC value of picture with respect to current picture's POC and a indicator signaling if the referred picture is used by current picture ad a reference or not may be stored in the RPS.

Since IDR pictures do not require any previous pictures in order to be decoded, a picture order count for the pic_order_cnt_lsb syntax element may be inferred to be 0 thus reducing the bitrate of the bitstream. The first slice in the picture in decoder order is signaled by a first_slice_in_pic_flag being set equal to 1. As a result, the syntax element first_slice_in_pic_flag with a value equal to 1 serves as a boundary to identify the start of an IDR picture in the case where two or more IDR pictures are sent back to back. However, in some cases it is not possible to distinguish between slices belonging to back to back IDR pictures at the video layer. The first such case is if packets arrive out of order at the decoder. The second such case is if the packet containing the first slice of an IDR picture is lost. Also, when all the pictures of a coded video sequence are signaled by intra coding as IDR pictures (e.g., when using an all intra profile) all of the pictures have pic_order_cnt_lsb value of 0. Thus, to permit the decoder to identify a specific IDR picture from another IDR picture, the system should signal a different pic_order_cnt_lsb value for each. In addition, the BLA picture which is similar to an IDR picture, and has only I slices can signal non-zero value for pic_order_cnt_lsb element.

Referring to FIG. 10, to increase the robustness of the decoder in decoding the bitstream, the pic_order_cnt_lsb syntax element should be signaled for IDR pictures. In the embodiment of the slice header illustrated in FIG. 10, the pic_order_cnt_lsb specifies the picture order count modulo MaxPicOrderCntLsb for the current picture. The length of the pic_order_cnt_lsb syntax element is log 2_max_pic_order_cnt_lsb_minus4+4 bits. The value of the pic_order_cnt_lsb is in the range of 0 to MaxPicOrderCntLsb−1, inclusive.

An alternative technique would include not signaling the pic_order_cnt_lsb syntax element for BLA pictures, thus inferring it to be 0 to be consistent with IDR signalling. As a result, the IdrPicFlag derivation is preferably changed to also include BLA. Also, the IdrPicFlag is preferably renamed as IdrBlaPicFlag. Additionally PicOrderCntVal calculation is preferably modified for BLA pictures. Alternatively, a new flag IdrBlaPicFlag may be included while maintaining the IdrPicFlag.

In general IdrPicFlag will be true or 1 if it is an IDR picture. It will be false or zero otherwise. In one case the variable IdrPicFlag is specified as IdrPicFlag= (nal_unit_type==IDR_W_DLP||nal_unit_type==IDR_N_LP), where nal_unit_type refers to the NAL unit type.

In general IdrBlaPicFlag will be true or 1 if it is an DR picture or a BLA picture. It will be false or zero otherwise. In one case the variable IdrBlaPicFlag is specified as IdrBlaPicFlag=(nal_unit_type==IDR_W_DLP||nal_unit_type==IDR_N_LP||nal_unit_type==BLA_W_LP||nal_unit_type==BLA_W_LP||nal_unit_type==BLA_N_LP), where nal_unit_type refers to the NAL unit type.

This alternative technique may be employed because the BLA picture contains only I slices and may be the first picture in the bitstream in decoding order, or the BLA picture may appear later in the bitstream. Each BLA picture begins a new coded video sequence, and has the same effect on the decoding process as an IDR picture, as previously described. As a result, having a consistent way of signaling pic_order_cnt_lsb value for BLA and IDR pictures will allow them to be handled similarly by the decoder.

Referring to FIG. 11, to increase the consistency of the decoder in decoding the bitstream, and handling IDR and BLA pictures the pic_order_cnt_lsb syntax element may be signaled in the slice header of pictures other than an IDR picture or a BLA picture (e.g., !IdrBLAPicFlag).

Referring to FIG. 12, to increase the consistency of the decoder in decoding the bitstream, and handling IDR and BLA pictures the pic_order_cnt_lsb syntax element may be signaled in the slice header of pictures other an IDR picture or a BLA picture (e.g., !IdrBLAPicFlag). The remaining portion of the slice header may be signaled for pictures other than an IDR picture (e.g., !IdrPicFlag). Thus the remaining portion of the slice header may be signaled for BLA pictures.

Referring to FIG. 13, the pic_order_cnt_lsb syntax element may be at the beginning of the slice header. The pic_order_cnt_lsb field being at the beginning of the slice header more readily enables it to be checked first in slice header to understand which picture the slice belongs to before parsing other syntax elements in the slice. This is useful in environments where pictures are likely to arrive out-of-order and/or be lost.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A method for decoding a video bitstream comprising:
   (a) receiving a frame of said video that includes at least one coded tree block partitioned into at least one slice, where block reconstruction and entropy decoding for each of said at least one slice does not depend on another of said at least one slice, where at least one of said at least one block belongs to an IDR picture that is a coded picture that can be decoded without decoding any previous or future pictures;
   (b) receiving a syntax element indicating a picture order count least significant bits for said IDR picture in a slice header for a corresponding said slice for said IDR picture where the picture order count of a first IDR picture is not equal to a picture order count of a second IDR picture.

2. The method of claim 1 wherein the length of said picture order count least significant bit is log 2 of a maximum picture order count least significant bits minus 4 plus 4 bits.

3. The method of claim 1 wherein the value of said picture order count least significant bits is constrained within the range of 0 to a maximum picture order count least significant bits minus 1, inclusive.

4. The method of claim 1 further comprising signaling said syntax element with an IDR picture flag.

5. A decoder for decoding a video bitstream comprising:
   (a) a processor that receives a frame of said video that includes at least one coded tree block partitioned into at least one slice, where said processor entropy decodes and reconstructs blocks for each of said at least one slice independently of entropy decoding and reconstructing blocks of another of said at least one slice, where at least one of said at least one block belongs to an IDR picture that is a coded picture that can be decoded without decoding any previous or future pictures; where
   (b) said decoder receives a syntax element indicating a picture order count least significant bits for said IDR picture in a slice header for a corresponding said slice for said IDR picture, where the picture order count of a first IDR picture is not equal to a picture order count of a second IDR picture.

6. The decoder of claim 5 wherein the length of said picture order count least significant bit is log 2 of a maximum picture order count least significant bits minus 4 plus 4 bits.

7. The decoder of claim 5 wherein the value of said picture order count least significant bits is constrained within the range of 0 to a maximum picture order count least significant bits minus 1, inclusive.

8. The decoder of claim 5 further comprising signaling said syntax element with an IDR picture flag.

* * * * *